United States Patent [19]

Thompson

[11] Patent Number: 4,925,617
[45] Date of Patent: May 15, 1990

[54] METHOD OF FORMING A CLOSURE CAP WITH A SEAL

[75] Inventor: Mortimer S. Thompson, Maumee, Ohio

[73] Assignee: Tri-Tech Systems International, Inc., Maumee, Ohio

[21] Appl. No.: 60,218

[22] Filed: Jun. 10, 1987

[51] Int. Cl.⁵ .............................................. B29C 55/00
[52] U.S. Cl. .................................... 264/291; 264/296; 264/320; 215/341
[58] Field of Search ................ 215/329, 341; 264/154, 264/291, 292, 296, 320, 322, DIG. 47

[56] References Cited

U.S. PATENT DOCUMENTS

| | | |
|---|---|---|
| 521,788 | 6/1894 | Flanigan . |
| 953,513 | 7/1910 | Love . |
| 1,770,548 | 7/1930 | Oven . |
| 2,340,353 | 2/1944 | Weaver . |
| 2,423,295 | 7/1947 | Crabbe et al. . |
| 2,447,340 | 8/1948 | Jackson . |
| 2,456,560 | 12/1948 | Keith . |
| 2,852,054 | 9/1958 | Motley . |
| 2,885,105 | 5/1959 | Heyl et al. . |
| 2,961,119 | 11/1960 | Leach . |
| 3,038,624 | 6/1962 | Wieckmann . |
| 3,065,677 | 11/1962 | Loeser . |
| 3,171,458 | 3/1965 | Strong . |
| 3,200,981 | 8/1965 | Harding . |
| 3,243,851 | 4/1966 | Reitter, Jr. et al. . |
| 3,250,417 | 5/1966 | Powers, Jr. et al. . |
| 3,272,369 | 9/1966 | Grimsley . |
| 3,285,452 | 11/1966 | Moloney et al. . |
| 3,286,866 | 11/1966 | McIntosh . |
| 3,339,770 | 9/1967 | Weigand . |
| 3,343,700 | 9/1967 | Heubl . |
| 3,344,942 | 10/1967 | Hedgewick . |
| 3,348,717 | 10/1967 | Treanor . |
| 3,352,127 | 11/1967 | Skinner, Sr. . |
| 3,352,448 | 11/1967 | Livingstone . |
| 3,374,913 | 3/1968 | Zipper . |
| 3,405,439 | 10/1968 | Uemura . |
| 3,418,409 | 12/1968 | Hesse et al. . |
| 3,460,703 | 8/1969 | Leftault, Jr. . |
| 3,482,725 | 12/1969 | Exton . |
| 3,532,786 | 10/1970 | Coffman . |
| 3,557,275 | 1/1971 | Longshaw et al. . |
| 3,557,985 | 1/1971 | St. Denis et al. . |
| 3,567,233 | 3/1971 | Stephanich . |
| 3,612,324 | 10/1971 | Malick . |
| 3,613,929 | 10/1971 | Treanor . |
| 3,784,041 | 1/1974 | Birch . |
| 3,820,799 | 6/1974 | Abbes et al. . |
| 3,861,551 | 1/1975 | Hannon . |
| 4,016,996 | 4/1977 | Aichinger et al. . |
| 4,069,937 | 1/1978 | Smalley . |
| 4,090,631 | 5/1978 | Grussen . |
| 4,091,948 | 5/1978 | Northup . |
| 4,141,463 | 2/1979 | Smith . |
| 4,143,785 | 3/1979 | Ferrell . |
| 4,153,172 | 5/1979 | Bialobrzeski . |
| 4,196,818 | 4/1980 | Brownbill . |
| 4,202,462 | 5/1980 | Imber . |
| 4,206,852 | 6/1980 | Dunn et al. . |
| 4,209,102 | 6/1980 | Dunn et al. . |
| 4,210,251 | 7/1980 | Grussen . |
| 4,218,067 | 8/1980 | Halling . |
| 4,253,581 | 3/1981 | Aichinger et al. . |
| 4,257,525 | 3/1981 | Thompson . |
| 4,274,544 | 6/1981 | Westfall . |
| 4,281,774 | 8/1981 | Mumford . |

(List continued on next page.)

FOREIGN PATENT DOCUMENTS

| | | |
|---|---|---|
| 764429 | 3/1971 | Belgium . |
| 3523771 | 1/1987 | Fed. Rep. of Germany ...... 264/291 |
| 788148 | 8/1956 | United Kingdom . |

(List continued on next page.)

*Primary Examiner*—Jan H. Silbaugh
*Assistant Examiner*—Allan R. Kuhns
*Attorney, Agent, or Firm*—Hedman, Gibson, Costigan & Hoare

[57] ABSTRACT

A method for forming a linerless cap for a container, the apparatus for forming the linerless cap and the linerless cap. The cap has a peripheral skirt and a plastic lid with an annular wall adjacent the skirt extending upwardly therefrom, wherein the wall has an inner stretched, softened non-projecting sealing surface which upon engagement compresses and seals.

4 Claims, 2 Drawing Sheets

U.S. PATENT DOCUMENTS

| | | |
|---|---|---|
| 4,281,979 | 8/1981 | Doherty . |
| 4,290,614 | 9/1981 | Moll . |
| 4,343,408 | 8/1982 | Csaszar . |
| 4,345,692 | 8/1982 | Obrist et al. . |
| 4,360,114 | 11/1982 | Owens . |
| 4,360,149 | 11/1982 | Hein . |
| 4,386,044 | 5/1983 | Arndt et al. . |
| 4,392,579 | 7/1983 | Uhlig et al. . |
| 4,394,918 | 7/1983 | Grussen . |
| 4,418,828 | 12/1983 | Wilde et al. . |
| 4,442,947 | 4/1984 | Banich, Sr. . |
| 4,470,513 | 9/1984 | Ostrowsky . |
| 4,475,274 | 10/1984 | Beckstrom et al. . |
| 4,497,765 | 2/1985 | Wilde et al. . |
| 4,506,795 | 3/1985 | Herr . |
| 4,550,844 | 11/1985 | Lininger . |
| 4,552,279 | 11/1985 | Mueller et al. . |
| 4,563,325 | 1/1986 | Coffman . |
| 4,595,547 | 6/1986 | Herr . |

FOREIGN PATENT DOCUMENTS

| | | |
|---|---|---|
| 930866 | 8/1956 | United Kingdom . |
| 1024762 | 10/1962 | United Kingdom . |
| 1048727 | 3/1965 | United Kingdom . |

OTHER PUBLICATIONS

Cyrogenics, (Jul. 1980)—M. Shinohara, T. Kugo, and K. Ono, Superleak-Tight Stainless Steel Hollow O-Ring Seals for Cryogenic Use.

METHOD OF FORMING A CLOSURE CAP WITH A SEAL

FIELD OF THE INVENTION

This invention relates to a closure cap with a seal and to a method of and apparatus for forming said closure and seal.

BACKGROUND OF THE INVENTION

The function of a closure cap to adequately seal the contents of a container against leakage from or into the container traditionally has been met by incorporating a soft liner to effect a seal between the under portion of the cap lid and the upper face of the bottle neck rim. The liner may be preformed from sheet or formed in place and is produced from materials or laminar combinations of materials which provide easy cold formability to enable the liner to conform to the individual configuration of the neck rim, including manufacturing aberrations and defects. Because of the specialized sealing function of a liner, it is typically made from softer polymers than those selected to perform the more structural cap functions of providing a strong resilient enclosure for the neck opening with a strong mechanical engagement therewith. In some instances stiffer and stronger polymers, including some which are suitable for producing threaded caps, may be expanded to produce voids and a less dense sheet having a softer, more flexible characteristic and liners may be made therefrom.

An alternative approach in popular use is a laminate of paperboard substrate with a soft sealing surface such as wax or plastic. This approach offers low cost but has performance limitations especially when moisture is present.

Because of an economic advantage, much attention has been devoted to developing caps which have an integral, "linerless" seal. The availability of such semi-rigid plastics as polypropylene and polyethylene, which combine a moderate level of strength and resilience with a moderate level of softness and conformability, has made possible popular use of caps with linerless seals. Typically, such caps employ a circular flange under the cap lid having a wedge shape cross section the lower portion of which is then and flexible and intended to abut the top surface of the bottle neck rim in a compressive action for sealing. The wedge shape flange generally is vertical and provides a sealing area restricted to the width of the narrower more flexible portion of the wedge shape. For their effective use they depend upon a very high level of sealing force on a very limited sealing area which makes them susceptible to sealing surface imperfections and the decay of sealing force over long time periods.

Other linerless caps employ conical flanges at an angle from the vertical or with quarter-round or claw shape so that capping will cause the flanges to flex and slide out over the top surface or the neck rim thereby creating a somewhat larger sealing area than obtainable with vertical flanges in straight compression. While the larger sealing area has advantages, this is offset by the fact that the sealing pressure is at the same time reduced because of the thinness at the sealing area resulting from the severe tapers in cross section which is normally required. This limitation results from the difficulty of removing such features from an injection mold. This also results in more complex and costly mold construction and operation and also excludes the more rigid plastics from use.

Still other linerless caps employ conical flanges which engage the corners of the neck rim with the underside of the flange. Such features rely on the use of very high sealing pressure directed against a restricted contact at the rim corners to obtain sealing integrity. In such cases sealing integrity depends on container rim corners which are without blemishes as produced and which, because they are most susceptible to marring during handling, must be suitably protected from such before they are capped and sealed. Also, to the extent that the conical flanges approach the shape of a cylinder, their sealing integrity is affected by out-of-round or other common dimensional variations of the container manufacturing process or variations between manufacturers resulting from the fact that inside neck dimensions typically are not specified. And to the extent that the flanges become more conical, more complex and costly mold construction and operation result.

Still another type of linerless cap employs a plug configuration in sealing contact with the inside wall of the container neck. This type of seal has the advantage of engaging that surface of the bottle neck which may be freest from manufacturing defects and most protected from incidental marring in handling thereafter. However, wide manufacturing dimensional tolerances and the industry-wide practice of not specifying the neck bore dimension impose severe limitations in trying to obtain consistent sealing engagement and integrity. As a result, resistance to tapered plug seals can push the cap lid up to varying degrees of undesirable dome shapes. Or such plug seals can yield unacceptably wide variations in sealing engagement and pressures. Efforts to overcome such deficiencies have led to proposed designs with flanges extending radially from generally cylindrical plugs wherein the outer rim of the flange makes a narrow sealing contact with the neck bore and is supported by a cantilevered flexing action. (See, for example, U.S. Pat. Nos. 4,090,631 4,016,996 and 4,210,251). An additional problem has been encountered with this type of linerless seal in that the lip or rim of the flange may be distorted by the neck rim during capping leading to imperfect seals. Efforts to eliminate this problem can introduce other problems specific to pressurized containers wherein blow-off or missiling of the caps can occur during uncapping. Another effort to avoid distortion of the lip or rim of such a seal is a cap design and method of producing it wherein a radially extending flange having a downward orientation as molded is hingedly "bent", "folded", or inverted into an upward orientation before it is applied to the container where sealing occurs at or adjacent the rim of the inverted flange portion and, importantly, not at the hinge (British Pat. No. 1,024,762). This is accomplished with extra mold portions and actions during part removal or subsequently in an appropriate fixture to hingedly invert the flange. This effort, therefore, requires the molding of a seal of complex shape utilizing a complicated and costly mold construction and molding operations followed by inverting the sealing portion of the seal hingedly to alter its orientation but not its shape.

Importantly, in all cases an inherent limitation to heretofore available linerless caps is that the sealing surface has the same plastic in the same physical state as the structural portion of the cap. This has called for a compromise in the softness and conformability of the sealing surface or in the strength of the structural cap portions, or most frequently both, with consequent limitations in the cap usefulness. That is, to achieve a softer more conformable seal, poorer thread strength must be accepted or to achieve greater thread strength, a harder, less conformable seal must be accepted.

Thus, known caps with linerless seals are beset with drawbacks and problems associated with their need to perform with container necks having imperfect sealing surfaces and wide dimensional tolerances; their limited sealing integrity based on restricted sealing area; the fact that sealing surface softness and conformability are limited; the fact that the use of more rigid plastics are not feasible; and the higher cost and complexity of mold construction and operation for a number of the proposed sealing designs.

SUMMARY OF THE INVENTION

In accordance with the present invention, there is provided a new and unique cap with a seal which develops a positive sealing pressure and engagement with a container opening upon closing the container. The cap is substantially rigid and includes plastic material and has a top wall or lid which covers the container opening. The cap has a depending skirt which engages the finish of the container for closing thereof. The seal is internally spaced from the peripheral skirt and includes a highly compressible sealing portion which as a conformable surface produced by stretching which is relatively softer than its contiguous unstretched portions. As the cap is applied to the container for closing, the seal engages the container finish and readily compresses to provide a relatively large sealing area to seal the container product. Preferably the seal is integral with and part of the top wall adjacent to the skirt.

In a preferred embodiment, the linerless sealing surface is relatively softer than the other cap portions as a result of altering it to include microscopic voids which soften it and make it less dense and more compressible by employing plastics of the invention which exhibit this characteristic when stretched.

In a method for producing the cap with an integral seal of the invention, the cap preferably is formed from a plastic of the invention, first by conventional molding techniques, such as injection or compression molding. The cap has a generally flat lid. Thereafter the cap is engaged by stretching tools which grip and hold in place the cap skirt while gripping and axially displacing the central lid portion so that a peripheral lid portion is stretched. The stresses imposed by this stretching operation stretches the plastic beyond its tensile yield point to produce microscopic voids which lower the density and soften the sealing surface to make it more conformable.

A feature of the invention is that very high degrees of softness can be achieved for linerless cap sealing surfaces without compromising the strength and rigidity characteristics of the remainder of the cap including threaded portions.

Another feature of the invention is that significant depths of softness can be achieved in the substrate below the sealing surface to assure high sealing performance on container sealing surfaces having significant imperfections.

Still another feature of the invention is its low cost manufacturing methods using low cost molds and molding operations and low cost reforming machinery and operations.

BRIEF DESCRIPTION OF DRAWINGS

The following is a detailed description together with accompanying drawings of illustrative embodiments of the invention. It is to be understood that the invention is capable of modification and variation apparent to those skilled in the art within the spirit and scope of the invention.

FIGS. 4-6 are longitudinal sectional views illustrating a preferred method and apparatus of the invention for forming linerless caps, wherein FIG. 4 illustrates the relationship between a preformed cap and apparatus before engagement, FIG. 5 illustrates the initial engagement between the cap and apparatus, and FIG. 6 illustrates how the apparatus provides a linerless cap having a lid with structurally functional side walls with non-projecting, stretched, softened, inner sealing surfaces.

DETAILED DESCRIPTION OF THE DRAWINGS

Figure 1:
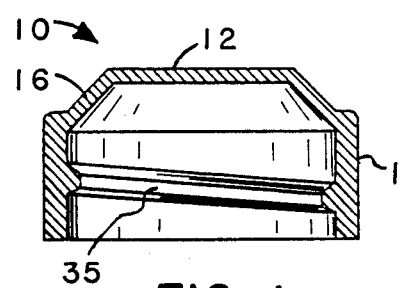
FIG. 1 is a longitudinal sectional view of a preferred embodiment of the linerless cap of the invention.
Figure 2:
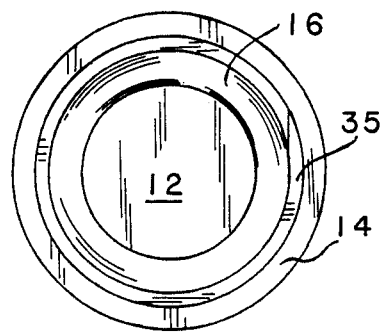
FIG. 2 is a bottom view of the linerless cap of FIG. 1.
Figure 3:
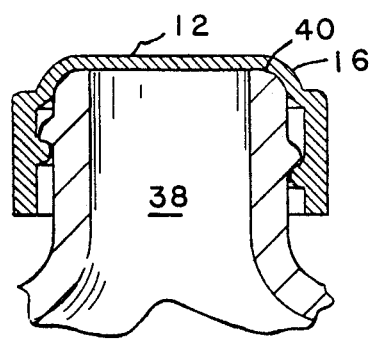
FIG. 3 is a longitudinal sectional view of the linerless cap of FIG. 1 applied to a container, such as a bottle neck, with the sealing portion of the cap in sealing engagement with the container.

Referring to FIGS. 1 to 3, there is shown a semi-rigid, cap 10 molded of a plastic of the invention having a lid 12, a depending peripheral skirt 14 including an internal thread 35 and an integral linerless seal 16 which is also a structural, functional, and non-projecting portion of the lid 12. The lid linerless sealing portion 16 is softer than contiguous portions of the lid 12 or the cap 10 as a result of the method for its production which stretches it.

FIG. 1 shows the cap 10 before capping including a tapered linerless lid sealing portion 16. FIG. 3 shows that upon sealing engagement with the rim 40 of container neck 38 the seal 16 assumes a shape defined by the rim 40.

Figure 4:
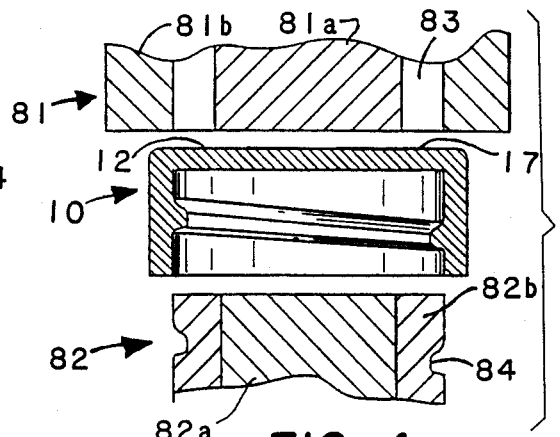
Figure 5:
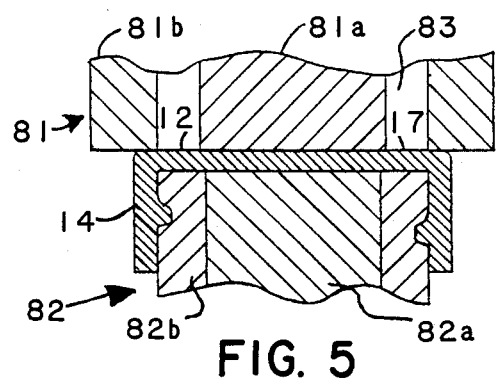
Figure 6:
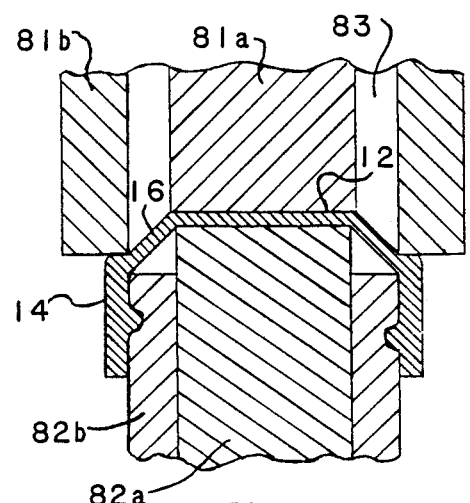

Referring to FIGS. 4 to 6, there is shown a preferred method of the invention for forming the lid linerless sealing portion 16 of FIGS. 1 to 3. In FIG. 4 the cap 10 which already has been formed by conventional molding techniques, such as injection molding with a flat lid 12 and is positioned between an upper stretching tool 81 and a lower stretching tool 82. The upper stretching tool 81 includes a central portion 81a and an outwardly displaced concentric portion 81b with a gap 83 therebetween. The lower stretching tool 82 includes a central portion 82a and a concentric abutting portion 82b having an external thread 84. FIG. 5 shows the stretching tools 81 and 82 in engagement prior to stretching wherein lower stretching tool 82 has been brought into a compressive engagement with the underside of lid 12 and upper stretching tool 81 has been brought into a compressive engagement with the upper surface of lid 12. FIG. 6 shows how the linerless seal 16 is formed thereafter by the continued upward movement of lower stretching tool component 82a and the reversed upward movement of upper stretching tool component 81a with the central portion of lid 12 gripped in compression therebetween while the skirt 14 is held downwardly by upper stretching tool 81b and outwardly by lower stretching tool 82b. This action by the tools 81 and 82 causes the periphery 17 of lid 12 to stretch and soften to produce the linerless seal 16 of the invention.

To facilitate the stretching operation, in the case of polypropylene, the cap preferably may be at a temperature of about ambient to 150 degrees F for stretching cycles of about one-half to two seconds. Lower temperatures and higher strain rates are preferred to maximize the desired strain of the invention imposed by the stretching operation on the plastic as discussed hereinafter with respect to FIGS. 7 and 8.

Figure 7:
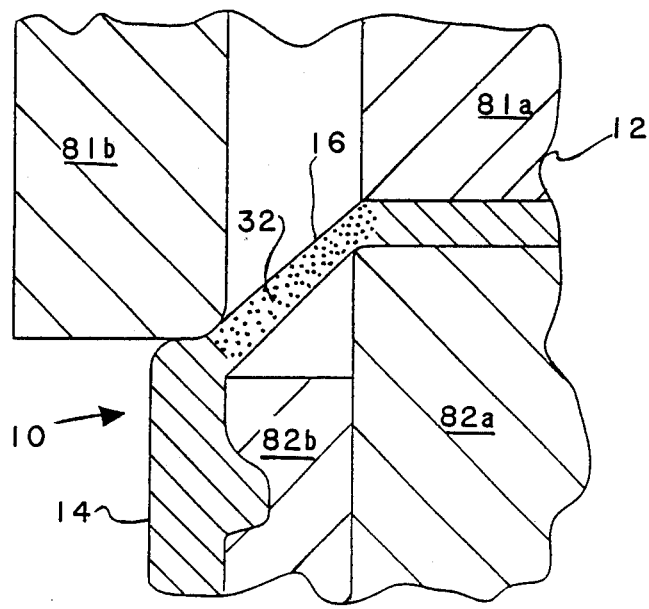
FIG. 7 is an enlarged sectional view of a portion of the apparatus and cap of FIG. 6, schematically illustrating the production of microscopic voids in a side wall of the lid of the cap formed from plastics useful in the practice of the invention which produce microscopic voids upon stretching.
Figure 8:
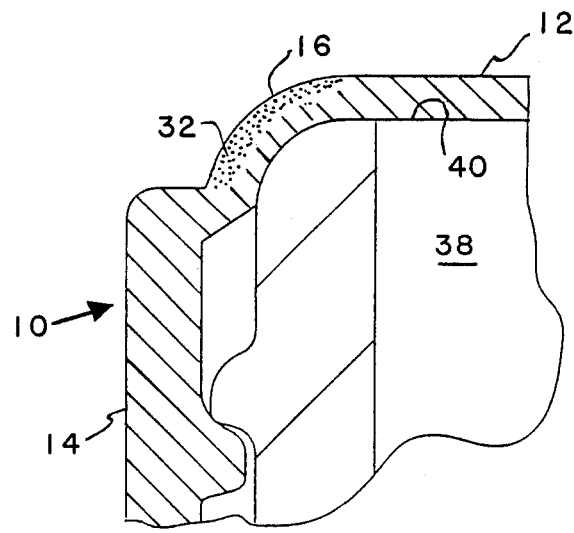
FIG. 8 is an enlarged sectional view of a portion of the container and cap of FIG. 3, schematically illustrating what occurs to the microscopic voids upon sealing the cap on the container.

Referring now to FIGS. 7 and 8, the reforming method modifies the physical properties of the plastic in such a way as to further enhance its sealing characteristics. That is, the plastic at the seal 16 is made softer and more conformable as a result of the production of microscopic voids thereat by employing plastics which form such voids upon stretching. FIG. 7 shows the stretched sealing portion 16 of FIG. 6 including microscopic voids 32 produced during the stretching operation. The size and/or number of the voids 32 are in relationship to the manner and degree to which the plastic has been stretched. FIG. 8 shows the seal 16 employed as a rim seal in compression against the rim 40 of a container neck 38 with the resultant reduction and elimination of the voids in the seal area. Preferably the rim 40 of container neck 38 is sloped outwardly and downwardly across most of its width to optimally engage the cap seal 16.

Thus it can be seen that the stretching process of the invention is used to create more suitable physical properties of the plastic at the sealing surface from those of a more rigid, unyielding material desired for overall cap strength and integrity to those of a softer, more yielding and conformable material desired for improved sealing characteristics.

The stretching method of the invention illustrated by FIGS. 4 to 6 produces a linerless seal 16 which possesses a desired large sealing area which preferably ranges up to about 0.250 inch radially. The plastic of the seal 16 is stretch-softened throughout its full thickness which normally will range from 0.030 to 0.080 inch. The angle made by seal 16 with the lid 12 preferably ranges from 30 to 60 degrees.

Cap sizes may typically range from under 20 mm to 120 mm and bottle and/or jar sizes range from under 2 ounce to 128 ounce capacity. Larger capacity containers such as drums or kegs are also suitable for the practice of the invention as are smaller vials and other containers.

Useful plastics which can be used for forming the caps and linerless seals of the invention are chosen from the group of plastics which have in common the fact that when stretched beyond their tensile yield point they develop microscopic voids or fissures within the plastic which serve to soften it and make it more compressible. The group of plastics manifesting this behavior includes essentially all polymer classes (e.g., polystyrene, polyvinyl chloride, polyolefins, polycarbonates, polysulfones, polyesters, nylons, etc.) and preferably are selected from the group of plastics known as alloys, blends, multipolymers, multiphase polymers or other nomenclature, many of which are listed in Modern Plastics Encyclopedia, 1986–1987, pages 105 to 111, the entire disclosure of which is incorporated herein by references. Examples of such polymers are ethylene-propylene copolymers (e.g., Himont SB781) and rubber modified polystyrene (e.g., Monsanto Lustrex 4300). Typically a useful plastic is a propylene copolymer, Shell 7522, which upon stretching produces microscopic voids in the range of about 0.25 to about 3.0 microns.

The linerless seals of the present invention can be used in a wide variety of caps such as continuous or discontinuous thread, snap, vacuum, dispensing and child resistant caps and can include combinations with other materials (e.g., caps having metal lid portions or portions utilizing different plastic than that used for the seal). Such linerless seals may be used to close and seal a wide variety of containers for a wide variety of products including: beverages, including carbonated soft drinks and pasteurized beverages such as beer; foods, especially those where container sealing performance is critical, including oxygen sensitive ones such as mayonnaise, peanut butter and salad oil, and including corrosive ones such as vinegar, lemon juice; and household chemicals, including bleaches and detergents, drugs and cosmetics and other products requiring the highest integrity seal and reseal under the widest range of distribution and use conditions.

Further, the linerless seals of the present invention can be used in conjunction with other types of linerless seals including other type seals of the invention.

The invention in its broader aspects is not limited to the specific described embodiments and departures may be made therefrom with the scope of the accompanying claims without sacrificing its chief advantages.

I claim:

1. A method for forming a cap including a linerless seal, comprising:
    molding a cap having a lid comprising plastic material and a peripheral skirt, and prior to engagement with a container opening,
    engaging the lid and moving a portion of the lid adjacent to the skirt to pre-stretch the inner surface of said portion and thereby provide a lid with a preformed inner sealing surface adjacent the skirt which has been softened and is non-projecting, and which upon subsequent engagement with a container opening is adapted to compress and seal thereto.

2. The method of claim 1, wherein said sealing surface comprises plastic which when stretched produces microscopic voids.

3. The method of claim 1, wherein the central portion of the lid is engaged and moved relative to the portion of the lid adjacent the skirt.

4. The method of claim 3, wherein the molded cap has an annular lid which upon engagement and movement produces a pre-stretched annular, non-projecting, softened inner sealing surface adjacent the skirt.

* * * * *